(12) United States Patent
Candelore

(10) Patent No.: US 8,438,589 B2
(45) Date of Patent: May 7, 2013

(54) OBTAINING METADATA PROGRAM INFORMATION DURING CHANNEL CHANGES

(75) Inventor: Brant L. Candelore, San Diego, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 924 days.

(21) Appl. No.: 11/729,461

(22) Filed: Mar. 28, 2007

(65) Prior Publication Data

US 2008/0244637 A1    Oct. 2, 2008

(51) Int. Cl.
*H04N 7/16* (2011.01)

(52) U.S. Cl.
USPC .................................. 725/9; 725/14

(58) Field of Classification Search .................. None
See application file for complete search history.

(56) References Cited

U.S. PATENT DOCUMENTS

| | | | |
|---|---|---|---|
| 4,741,047 A | 4/1988 | Sharpe, II | |
| 5,262,860 A | 11/1993 | Fitzpatrick et al. | |
| 5,499,108 A | 3/1996 | Cotte et al. | |
| 5,513,356 A | 4/1996 | Takahashi et al. | |
| 5,726,645 A | 3/1998 | Kamon et al. | |
| 6,028,970 A | 2/2000 | DiPiazza et al. | |
| 6,097,520 A | 8/2000 | Kadnier | |
| 6,101,274 A | 8/2000 | Pizano et al. | |
| 6,181,326 B1 | 1/2001 | Takahashi | |
| 6,204,842 B1 | 3/2001 | Fujii | |
| 6,219,453 B1 | 4/2001 | Goldberg | |
| 6,249,283 B1 | 6/2001 | Ur | |
| 6,249,765 B1 | 6/2001 | Adler et al. | |
| 6,281,880 B1 | 8/2001 | Rose et al. | |
| 6,349,352 B1 | 2/2002 | Lea | |
| 6,400,996 B1 | 6/2002 | Hoffberg et al. | |
| 6,407,779 B1 | 6/2002 | Herz | |
| 6,415,099 B1 | 7/2002 | Berger | |

(Continued)

FOREIGN PATENT DOCUMENTS

| | | |
|---|---|---|
| EP | 0720114 A2 | 11/1995 |
| EP | 1074926 A2 | 8/2000 |

(Continued)

OTHER PUBLICATIONS

U.S. Appl. No. 60/853,873 filed Oct. 23, 2006.

*Primary Examiner* — Brian Pendleton
*Assistant Examiner* — Fernando Alcon
(74) *Attorney, Agent, or Firm* — Blakely, Sokoloff, Taylor & Zafman LLP

(57) ABSTRACT

One embodiment provides a method and apparatus for obtaining metadata program information during channel changes. The method includes the capture of an on-screen display that is rendered by a rendering device such as, for example, a digital television system. The on-screen display may be generated by an access device such as a set-top box in response to a program selection event. Once captured, the on-screen display may be decoded to determine metadata for a program selected by the program selection event. In one embodiment, decoding may be provided using pattern matching, optical code recognition (OCR) or other like decoding technique for decoding a video frame to determine metadata for a program selected by the program selection event. In one embodiment, a copy of the program in conjunction with the captured metadata are stored within the persistent memory of a digital television device. Other embodiments are described and claimed.

21 Claims, 7 Drawing Sheets

U.S. PATENT DOCUMENTS

| | | |
|---|---|---|
| 6,480,304 B1 | 11/2002 | Os et al. |
| 6,587,586 B1 | 7/2003 | Cui et al. |
| 6,614,930 B1 | 9/2003 | Agnihotri et al. |
| 6,658,662 B1 | 12/2003 | Nielsen |
| 6,681,395 B1 | 1/2004 | Nishi |
| 6,761,635 B2 | 7/2004 | Hoshino et al. |
| 6,769,127 B1 | 7/2004 | Bonomi et al. |
| 6,774,813 B2 | 8/2004 | van Ee et al. |
| 6,844,900 B2 | 1/2005 | Yuen |
| 6,963,784 B1 | 11/2005 | Gibbs |
| 7,038,738 B2 | 5/2006 | Kwon |
| 7,058,712 B1 | 6/2006 | Vasko et al. |
| 7,088,873 B2 | 8/2006 | Anisimovich et al. |
| 7,095,456 B2 | 8/2006 | Nakajima |
| 7,139,033 B2 | 11/2006 | Sun |
| 7,266,782 B2 | 9/2007 | Hull et al. |
| 7,456,902 B2 | 11/2008 | Kikinis |
| 7,600,244 B2 | 10/2009 | Maruyama et al. |
| 7,689,613 B2 | 3/2010 | Candelore |
| 7,814,524 B2 | 10/2010 | Candelore |
| 7,966,552 B2 | 6/2011 | Candelore |
| 7,991,271 B2 | 8/2011 | Candelore |
| 8,077,263 B2 | 12/2011 | Candelore |
| 8,079,055 B2 | 12/2011 | Hardacker et al. |
| 2001/0056575 A1 | 12/2001 | Wei et al. |
| 2002/0011923 A1 | 1/2002 | Cunningham et al. |
| 2002/0012462 A1 | 1/2002 | Fujiwara |
| 2002/0049978 A1* | 4/2002 | Rodriguez et al. ............... 725/86 |
| 2002/0056108 A1 | 5/2002 | Gerharter et al. |
| 2002/0083464 A1 | 6/2002 | Tomsen et al. |
| 2002/0157112 A1 | 10/2002 | Kuhn |
| 2002/0164149 A1 | 11/2002 | Wilkinson |
| 2003/0018748 A1 | 1/2003 | McKenna, Jr. |
| 2003/0030638 A1 | 2/2003 | Astrom et al. |
| 2003/0033603 A1 | 2/2003 | Mori et al. |
| 2003/0034885 A1 | 2/2003 | Catton et al. |
| 2003/0066085 A1 | 4/2003 | Boyer et al. |
| 2003/0095156 A1 | 5/2003 | Klein et al. |
| 2003/0149988 A1 | 8/2003 | Ellis et al. |
| 2003/0202773 A1* | 10/2003 | Dow et al. ........................ 386/46 |
| 2003/0217360 A1 | 11/2003 | Gordon et al. |
| 2004/0044693 A1 | 3/2004 | Hadley et al. |
| 2004/0075642 A1 | 4/2004 | Kisliakov |
| 2004/0080795 A1 | 4/2004 | Bean et al. |
| 2004/0090462 A1 | 5/2004 | Graham |
| 2004/0095376 A1 | 5/2004 | Graham et al. |
| 2004/0170392 A1 | 9/2004 | Lu et al. |
| 2004/0181815 A1* | 9/2004 | Hull et al. ....................... 725/134 |
| 2004/0190854 A1 | 9/2004 | Dunne et al. |
| 2004/0226042 A1* | 11/2004 | Ellis ................................. 725/43 |
| 2004/0266419 A1 | 12/2004 | Arling et al. |
| 2005/0028208 A1 | 2/2005 | Ellis et al. |
| 2005/0031163 A1 | 2/2005 | Rauh et al. |
| 2005/0108703 A1 | 5/2005 | Hellier |
| 2005/0154999 A1 | 7/2005 | Wugoski |
| 2005/0155064 A1 | 7/2005 | Yamada et al. |
| 2005/0201730 A1 | 9/2005 | Chen et al. |
| 2005/0204384 A1 | 9/2005 | Yuen et al. |
| 2005/0243354 A1 | 11/2005 | O'Neill |
| 2005/0282531 A1 | 12/2005 | Andreasson |
| 2006/0008260 A1 | 1/2006 | Chen et al. |
| 2006/0053470 A1 | 3/2006 | Colter et al. |
| 2006/0070106 A1 | 3/2006 | Kitazato |
| 2006/0085812 A1 | 4/2006 | Shishegar et al. |
| 2006/0090189 A1 | 4/2006 | Gruber |
| 2006/0271594 A1 | 11/2006 | Haberman |
| 2006/0282465 A1 | 12/2006 | Sharma |
| 2007/0005653 A1 | 1/2007 | Marsh |
| 2007/0098217 A1 | 5/2007 | Goyal |
| 2007/0140595 A1 | 6/2007 | Taylor et al. |
| 2007/0201757 A1 | 8/2007 | Madej et al. |
| 2008/0066100 A1* | 3/2008 | Brodersen et al. .............. 725/35 |
| 2008/0074548 A1 | 3/2008 | Nagata et al. |
| 2008/0097984 A1 | 4/2008 | Candelore |
| 2008/0098357 A1 | 4/2008 | Candelore |
| 2008/0098426 A1 | 4/2008 | Candelore |
| 2008/0098432 A1 | 4/2008 | Hardacker et al. |
| 2008/0098433 A1 | 4/2008 | Hardacker et al. |
| 2008/0122978 A1 | 5/2008 | Yen et al. |
| 2008/0155637 A1* | 6/2008 | Du Breuil ....................... 725/134 |
| 2008/0199150 A1 | 8/2008 | Candelore |
| 2009/0119714 A1 | 5/2009 | Schlarb et al. |
| 2010/0037264 A1 | 2/2010 | Hardacker et al. |
| 2010/0061709 A1 | 3/2010 | Agnihotri et al. |
| 2012/0062805 A1 | 3/2012 | Candelore |

FOREIGN PATENT DOCUMENTS

| | | | |
|---|---|---|---|
| GB | 2405018 | * | 2/2005 |
| WO | 0128240 | A1 | 4/2001 |
| WO | 0137465 | A2 | 5/2001 |
| WO | 0172040 | A2 | 9/2001 |
| WO | 03051031 | A2 | 6/2003 |

* cited by examiner

OSD 340

OSD 360

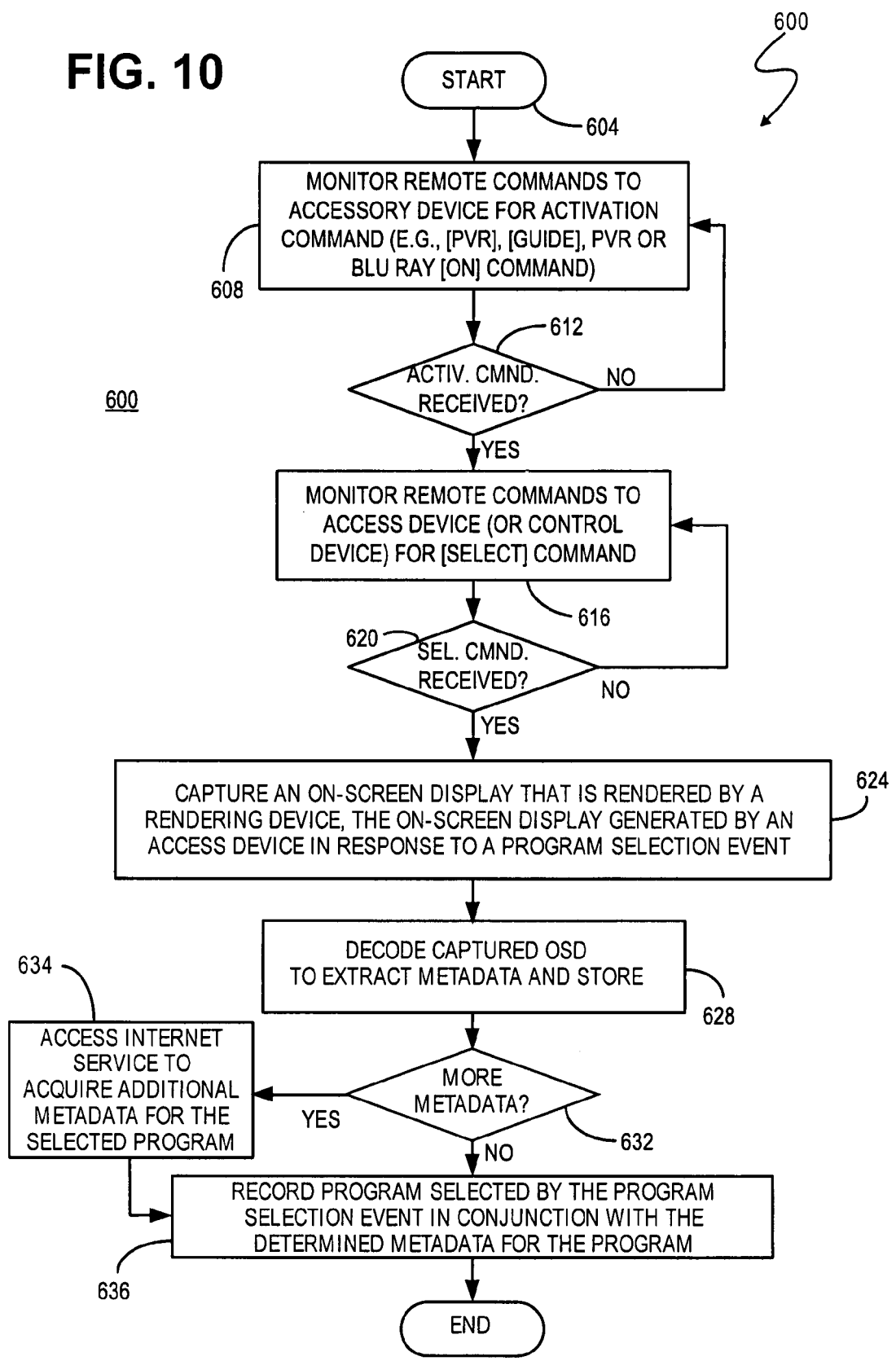

OBTAINING METADATA PROGRAM INFORMATION DURING CHANNEL CHANGES

RELATED APPLICATIONS

The present application is related to co-pending U.S. patent application Ser. No. 11/715,763, entitled "PHANTOM INFORMATION COMMANDS," and filed on Mar. 8, 2007.

COPYRIGHT NOTICE PER 37 CFR 1.71(e)

A portion of the disclosure of this patent document contains material which is subject to copyright protection. The copyright owner has no objection to the facsimile reproduction by anyone of the patent document or the patent disclosure, as it spears in the Patent and Trademark Office patent file or records, but otherwise reserves all copyright rights whatsoever. All trademarks used herein are the property of their respective trademark owners.

FIELD

The invention relates generally to the field of digital television systems. More particularly, one or more of the embodiments relate to obtaining metadata program information during channel changes.

BACKGROUND

The majority of US households receive television content through cable television systems. Such systems traditionally use a few OEM suppliers of hardware (e.g., set top boxes) and do not provide for integration of non-security navigation functionality of set-top boxes directly into digital TV sets. Under the so called "Plug and Play" agreement, the CableCARD™ adapter card was standardized as a way to adapt consumer electronics (CE) "navigation" devices to cable networks. While CableCARD™ standardization had promise, it was crippled by a lack of cable operator support, access to only a 1-way, lower tier of service, and no service-supplied metadata. With the advent of Switch Digital service, cable operators are further depreciating 1-way service by eliminating access to even some of the "basic" content.

Cable television Multiple Service Operators (MSOs) are presently establishing a new digital TV standard referred to as Open Cable Application Platform (OCAP) which will provide access to enhanced, 2-way functionality with unrestricted access to premium and high-value interactive services. Under this scenario, metadata (and the user interface) will be managed by OCAP applets downloaded to set-top boxes sold at retail. There is discussion about downloading OCAP applets to devices connected to those set-top boxes—so called "endpoints" in the home network. In this way, the cable operators are assured of the "proper display" of their user interface when playing back cable content.

Unfortunately, under the OCAP model, CE manufacturers' efforts to create an alternative user interface to that supplied via the OCAP application remain stymied because there is no way to gain access to the metadata. It is currently not possible to manage content in new ways that the customer might find compelling. Hence, the OCAP standard may force consumer electronics companies to conform to the user interfaces (UIs), Electronic Program Guides (EPGs), download protocols, and feature sets, defined by the MSOs using the OCAP standard. Unless a television receiver device such as a TV conforms to the OCAP standard (and its associated restrictions), it will be unable, among other things, to receive the meta-data related to the digital content. Without this meta-data, the television receiver is unable to display any information related to the content. As a result, improvements in technology, improved user interfaces and other features developed by such consumer electronics companies, which are incompatible with the MSO supplied OCAP interface, are unusable in an OCAP environment. Additionally, the consumer is stuck with whatever user interface and EPG capabilities are provided by their cable television supplier.

Internet services exist that can provide the desired descriptive material, however, to use such services, it is generally necessary to know the service provider, the time, and the channel number of the program being viewed. In a configuration where the STB is simply streaming decoded video to the TV (i.e., the STB is used as a tuner/decoder), the virtual channel number associated with the video is unknown. Without the virtual channel number, Internet services that provide meta-data or descriptive material are unavailable.

SUMMARY

One embodiment provides a method and apparatus for obtaining metadata program information during channel changes. The method includes the capture of an on-screen display that is rendered by a rendering device such as, for example, a digital television system. The on-screen display may be generated by an access device such as a set-top box in response to a program selection event. Once captured, the on-screen display may be decoded to determine metadata for a program selected by the program selection event. In one embodiment, decoding may be provided using pattern matching, optical code recognition (OCR) or other like decoding technique for decoding a video frame to determine metadata for programs selected by the program selection event. In one embodiment, a copy of the program in conjunction with the captured metadata are stored within the persistent memory of a digital television device. In a further embodiment, the digital television device may issue remote control commands to the access device to direct the access device to request additional on-screen displays to provide additional metadata regarding the selected program.

BRIEF DESCRIPTION OF THE DRAWINGS

The present invention is illustrated by way of example, and not by way of limitation, in the figures of the accompanying drawings and in which:

FIG. 10 is a flow chart depicting a method for obtaining metadata program information during channel changes, to obtain information on a selected program according to one embodiment.

DETAILED DESCRIPTION

Figure 1:
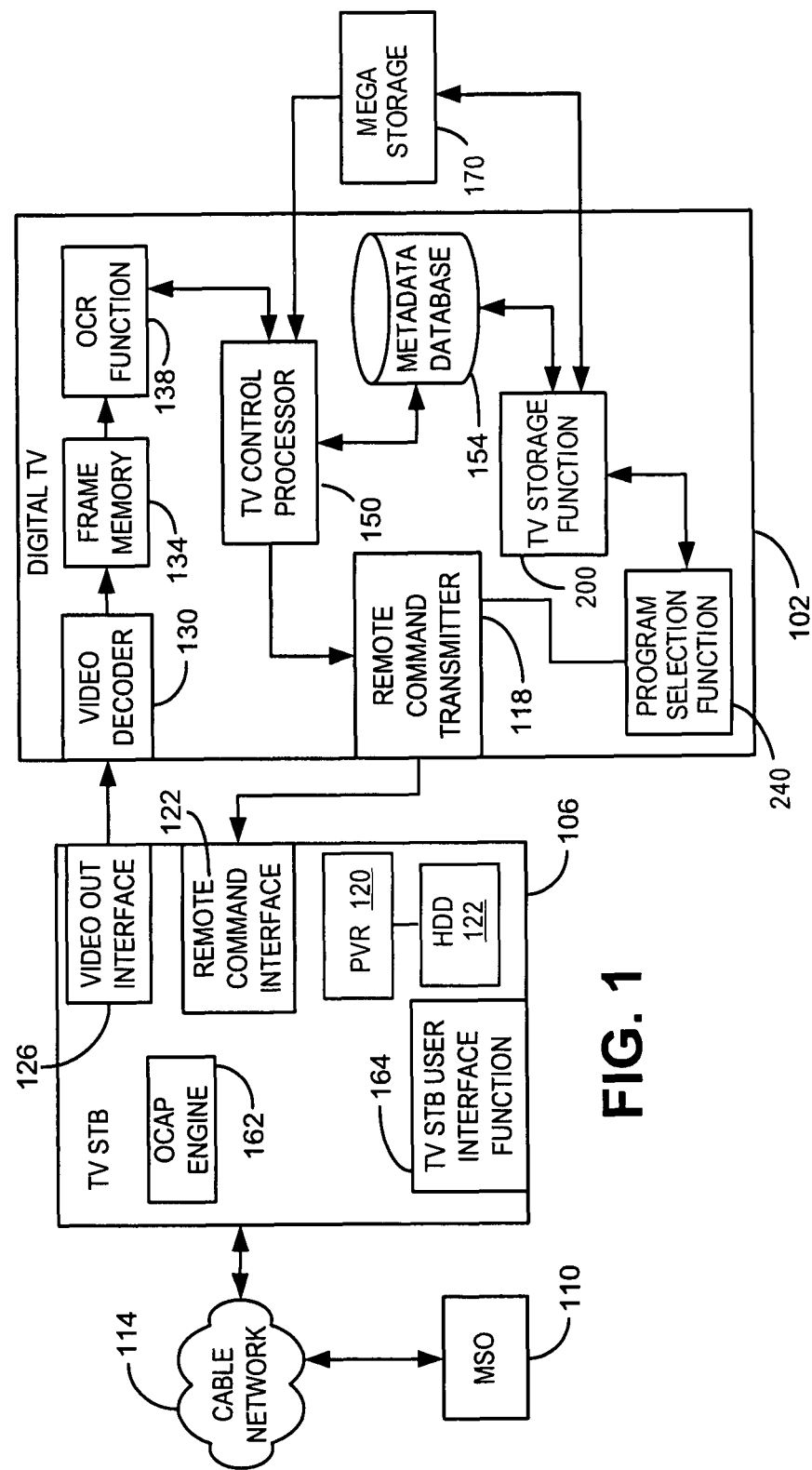
FIG. 1 is a block diagram of a set top box (STB) access device and a digital TV control device that obtains metadata program information during channel changes, according to one embodiment.

A method and apparatus for obtaining metadata program information during channel changes are described. As described in greater detail below, in certain embodiments a control device uses program selection events to capture metadata and/or command information associated with digital television content from a television receiver device serving as an access device. As described herein, the term "metadata" may include but is not limited to navigation information, scheduling information and program information such as a program name, parental rating, program duration, channel number program was recorded from, channel name program was recorded from, current data and time and the current list of favorites which is active. As described herein, the term "mini-metadata" may include but is not limited to minimum program information including the selected channel number and a system time or other like minimum program information displayed in response to a program selection event.

As described herein, the term "program selection event" includes, but is not limited to, a channel tuning event, a selection from a list of recorded programs on a personal video recorder (PVR), a selection from a list of Video on Demand (VOD) programs, a selection to play package media, a selection from a list of content stored on portable media, a selection from a list of content stored on portable devices. As described herein, a "channel tuning event" may include, but is not limited to, entry of a channel number, selection of a program from an EPG, toggling of channel tuning buttons of a remote or other like technique for selection of a program for display on a digital TV device. By capturing metadata for a program selected by a program selection event, controlling operation of the access device and/or presentation of the metadata can be manipulated by another device (such as a television set or network server) without the constraints imposed by a cable or satellite or Telco based television service provider.

In the embodiments described, remote control command that are issued by a remote control device are monitored to detect a program selection event. As described herein, remote control devices include, but are not limited to, hand-held battery operated controllers that are roughly five to ten inches in length and one to four inches wide and other like devices that use infrared (IR) and/or radio frequency (RF) transmissions to send encoded control messages to a target device such as a television, recorder, player, access device, set-top box, control device, etc. Currently, the most prevalent class of such devices use a numeric key pad along with dedicated command keys such as [ON], [MENU], [PLAY], [RECORD], [GUIDE], [SELECT], [LIST], etc. commands and keys representing channel and volume up and down incrementing commands.

As described herein, decoding techniques may include by are not limited to optical character recognition (OCR), pattern recognition or other like technique for analyzing video data, such as an on-screen display (OSD) to determine metadata associated with a user selected program. As described herein, a "control device" may include but is not limited to television sets and other devices using or incorporating television receivers and/or the OCR functions described herein including digital television sets, set-top boxes, set back boxes, digital video recorders, Blu-ray recorders, optical disc recorders, disc drive recorders and other devices without limitation.

As described herein, the term "access device" is intended to mean a device such as a television set-top box or other terminal that has direct access to the service provider's metadata through digital data communication, whereas the term "receiver device" is generally intended to represent the device that receives video content from the access device, but is unable to directly access the digital representation of the metadata. The receiver device, by virtue of becoming the master to the access device in accord with embodiments consistent with the present invention is also referred to as a control device.

In the following description, certain terminology is used to describe features of the invention. For example, the term "logic" is representative of hardware and/or software configured to perform one or more functions. For instance, examples of "hardware" include, but are not limited or restricted to an integrated circuit, a finite state machine or even combinatorial logic. The integrated circuit may take the form of a processor such as a microprocessor, application specific integrated circuit, a digital signal processor, a microcontroller, or the like.

An example of "software" includes executable code in the form of an application, an applet, a routine or even a series of instructions. The software may be stored in any type of computer or machine readable medium such as a programmable electronic circuit, a semiconductor memory device inclusive of volatile memory (e.g., random access memory, etc.) and/or non-volatile memory (e.g., any type of read-only memory "ROM", flash memory), a floppy diskette, an optical disk (e.g., compact disk or digital video disc "DVD"), a hard drive disk, tape, or the like.

A further example of software includes a "software module." A "software module" or "module" is a series of code instructions that, when executed, performs a certain function. Examples of such code include an operating system, an application, an applet, a program or even a subroutine. Software module(s) may be stored in a machine-readable medium, including, but not limited to, an electronic circuit, a semiconductor memory device, a read only memory (ROM), a flash memory, an erasable ROM (EROM), a floppy diskette, a computer disk, an optical disk, a hard disk, a fiber optic medium, a radio frequency (RF) link and the like.

The term "program" or "computer program" or similar terms, as used herein, is defined as a sequence of instructions designed for execution on a computer system. A "program", or "computer program", may include a subroutine, a function, a procedure, an object method, an object implementation, in an executable application, an applet, a servlet, a source code, an object code, a shared library/dynamic load library and/or other sequence of instructions designed for execution on a computer system.

The term "program", as used herein, may also be used in a second context (the above definition being for the first context). In the second context, the term is used in the sense of a "television program". In this context, the term is used to mean any coherent sequence of audio video content such as those which would be interpreted as and reported in an electronic program guide (EPG) as a single television program, without regard for whether the content is a movie, sporting event, segment of a multi-part series, news broadcast, etc. The term may also be interpreted to encompass commercial spots and other program-like content which may not be reported as a program in an electronic program guide.

One of the primary constraints to providing a CE Company with the ability to provide their own control mechanism is the potential inability to access the metadata associated with digital television programming. Normally such metadata is provided by the MSO to an approved (e.g., leased) access device. FIG. 1 is a block diagram of a STB access device 106 and a digital TV control device 102 that obtains metadata program information during channel changes according to one embodiment. As shown in FIG. 1, STB 106 may include a service provider personal video recorder (PVR) 120. Conventionally, service provider PVRs such as PVR 120 seem to run out of free memory space on hard disk drives (HDD) 122 for storing content selected by a user.

As further illustrated in FIG. 1, digital TV 102 may include personal video recorder capabilities such as provided by mega storage 170 which may include one or more storage mediums such as one or more Blu-ray discs by Sony Electronics®, Inc. of Parkridge, N.J. In one embodiment, OCR function 138, TV storage function 200, in combination with program selection function 240 to monitor remote control commands to enable digital TV 102 to directly record to digital video disc, Blu-ray disc or other like storage device for directly recording programs for set-top boxes or STBs that do not include a PVR such as PVR 120. In a further embodiment, digital TV 102 provides archival functions for recording content within mega storage 106 such as programs contained within HDD 122 to provide additional space within HDD 122. In a further embodiment, digital TV 122 may transfer shows from HDD 122 to mega storage 170 such as digital video disc, Blu-ray disc or other like persistent storage medium.

In the embodiments described, a limited amount of information may be captured in response to program selection events to enable synchronization of the tuning of a receiver with a recording by a recorder while using the service provider EPG which may entail recording the start and stop times and periodicy of the selected content. In a further embodiment, archiving of content may require direct recording of the selected content for first generation copies on DVD or Blu-ray disc (such as mega storage 170). However, additional information may be required to ensure proper recording, such as obtaining program information including the title, rating, actors, year produced as well as the channel from which the content was recorded from end time. In a further embodiment, the transfer of set-top box recorded content to discs for archival purposes may be provided.

Representatively, FIG. 1 illustrates that digital TV 102 is connected to a cable set-top box 106 serving as an access device to the MSO 110 via cable network 114. A user may tell the STB access device 106 to cycle through channels by sending IR or RF remote control commands to enable program selection for viewing on TV 102. In one embodiment, TV 102 issues commands using remote command transmitter 118 that are received by a remote command interface 122. This results in STB 106 generating a display of the EPG that is sent via the video output interface 126 to a video decoder 130. The video frame representing the EPG is then displayed and captured in a frame memory 134 of the digital TV 102. In one embodiment, program selection function 240 monitors the commands issued to STB 106 to detect a program selection event.

In one embodiment, an OCR function 138 is carried out on the stored frame stored in 134 under control of (or as a computer program running on) the digital TV's control processor 150. Once the OCR function has been carried out, the resulting information is stored in a metadata database 154, and can be used to record content to mega storage 170 using TV storage function 200 and program selection function 240 to detect a program selection event. In an alternative embodiment, information stored within metadata database 154 is used, for example, to present the viewer a different user interface. Metadata database 154 may be embodied in a hard disc drive or other storage medium that is used to store the content. In other embodiments, the data can further be used to create timers for recording devices such as personal video recorders (PVR—also known as digital video recorder DVR), video tape recorders, optical disc recorders, disc drives, etc.

As indicated above, metadata may include, but is not limited to, navigation data, scheduling data and program data. In one embodiment, an Optical Character Recognition (OCR) approach as described herein can be used to obtain all or portions of one or all three of the above metadata. As described herein, "navigation data" is information that allows an application to know that a particular channel (e.g., channel "KPBS") can be found on a particular logical channel (e.g., channel "15"). (In the case of interactive services such as VOD, there is no logical channel, and the program is launched by negotiating a number of on-screen displays (OSDs) and finally selecting the appropriate field from a list of choices.).

As further described herein, "scheduling data" is information that lets an application know that a particular program (e.g., the "News hour" program) starts at a particular time and will last for a particular duration (e.g., starts at "7 pm" and will last 1 hour). (Impulse Pay Per View (IPPV) is broadcast and therefore has a dedicated start time, while VOD runs on individual sessions and can start anytime.). As described herein, the term "program data" is information that provides other program related information. For example, program data lets an application know that the "News hour" is classified as "News/Business", contains Closed Captioning, and, like most news programs, is Not Rated. Program data may also include a short summary of the program's content.

In one embodiment, some type of other data source, back-channel or network connection might be used to supplement the information obtained by the OCR approach described herein. Many OCR software modules which operate on numerous operating systems can be used to carry out the OCR processes described herein, and therefore, they will not be described in great detail. By way of example, the commercially available Bizcardreader™ program can scan business cards and create a database from the information.

In addition to data that are strictly considered to be metadata, by properly commanding an access device such as a set top box, one can also learn other information about the access device, service provider and user. Such other information can include service tier, model of access device, service provider name, and other information. The term metadata is sometimes loosely used herein to describe not only metadata, but also such other service related information.

Referring again to FIG. 1, in the embodiments described, operation of the process is independent of the nature of the access device so long as the receiver device such as 102 can use some mechanism to detect when a user causes the access device to cycle through its pages of EPG and other metadata in response to a program selection event. The STB 106, for example, may be enabled with an OCAP engine 162 and will generally have its own user interface function 164, but using the described embodiments, such interface can be supplanted or supplemented by capture of the metadata that would otherwise be inaccessible to the digital TV 102.

In the event the access device is instructed to tune to a channel that is not authorized, the access device can generate an OSD stating that fact. In accord with preferred embodiments, the TV can interpret the OSD and tell the viewer that another channel needs to be tuned or the service provider needs to be contacted. When the service provider is known, such screens can be readily recognized and parsed by processor 150.

In one embodiment, the access device's UI can be totally replaced by the CE manufacturer without need to directly access the digital metadata. In such a scenario, the metadata stored in the metadata database are used to generate a TV UI. Commands sent to the TV, for example, from a remote commander that controls the UI can then be translated at processor 150 to an appropriate command that is then transmitted by remote command transmitter 118 to remote command interface 122 so that the user can be presented with the CE manufacturer's UI, yet the net effect is that the access device 106 becomes a slave to the digital TV which acts as a master.

Metadata captured from OSDs can thus allow the CE manufacturer's TV or other receiver device to manage and proxy the service provider set-top box (or other access device) into a home network with other devices conforming to more open standards, e.g. Digital Living Network Alliance (DLNA). The TV could further act as a gateway device to transform and stream content in IP format—allowing the TV or other interconnected devices to position itself as a home media server—aggregating content, from disparate sources, and presenting a uniform user friendly interface to play and manage content.

Referring again to FIG. 1, the control device, e.g. the DTV 102, can manipulate the access device, e.g. the set-top 106 box using remote control commands just as a human would. If the remote control has a "hot key" to access a certain screen, the control device can use it. If broadcast content is tuned using the 10-key numeric keypad to tune, the control device can do this as well. The problem arises when options are only provided in lists in which a user must highlight in order to select. In this instance, the control device recognizes the entry in order to be able to select it. As discussed later real-time OCR provides for this capability.

If a viewer can use the remote to display program and guide information, the control device can too. And then, all this information can be OCR'ed in to a database.

Remote control commands can be issued using any the following or any other suitable interface and control device:
1. IR or RF blaster
2. HDMI Consumer Electronics Control (CEC)
3. 1394 AVC using CEA 931B
4. Internet Protocol The following are the minimum remote control Keycode set required by OCAP for Cable:
Hot Buttons: [Guide], [Cancel], [Select], [List], [Power], [Info], [Menu], [Exit], [Last], [Function 0-3] [Favorite][Next Favorite], [On Demand]
Tune: [Channel Up], [Channel Down], [RF Bypass]
Sound: [Volume Up], [Volume Down], [Mute]
Arrows: [Up], [Down], [Left], [Right]
Page: [Up], [Down], [Left], [Right]
10-key: [0, 1, 2, 3, 4, 5, 6, 7, 8, 9 and multiple digit combinations]
Trick Play: [Fast forward], [Pause], [Rewind], [Skip Forward], [Skip Back], [Stop], [Play], [Record]

These are the basic set that most remote controls support. Not listed by the OCAP specification were: [Pip] and [Swap].

Figure 2:
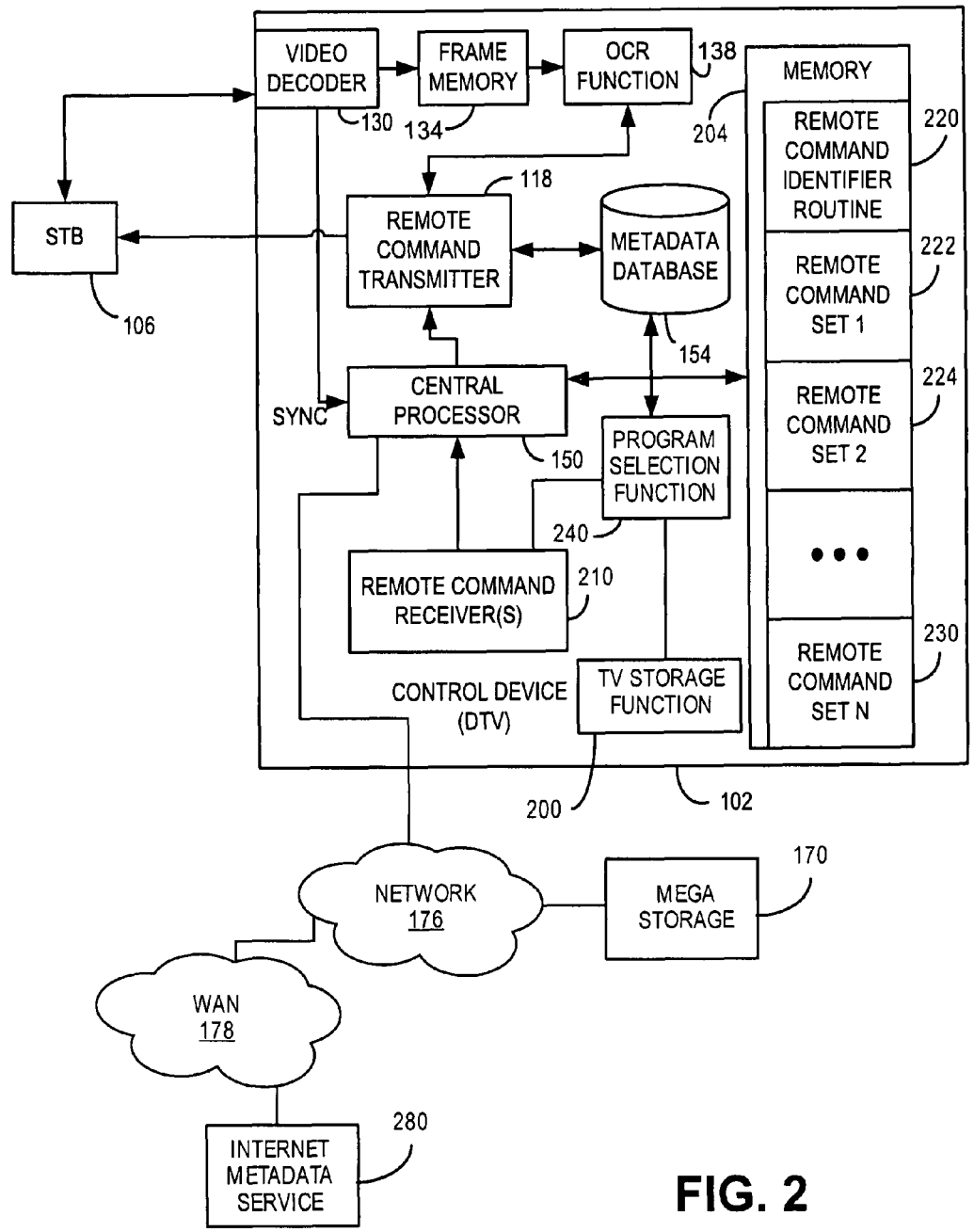
FIG. 2 is a block diagram of an STB access device and a digital TV control device that obtains metadata program information during channel changes, according to one embodiment.

Referring now to FIG. 2, a system in which the above process can be practiced is depicted. In this embodiment, central processor 150 carries out the above process as remote command set identifier routine 220 stored in memory 204 (e.g., disc memory or other nonvolatile memory). The various command sets are also stored in memory as RC command sets 222, 224 through 230. The remote command transmitter may be any suitable transmitter that is compatible with a receiver within access device 106 such as an infrared or RF transmitter 118 similar to that used in an STB remote control. Video decoder 130 provides an output that is indicative of the presence of a frame synchronization signal that can be detected by central processor 150.

Figure 3:
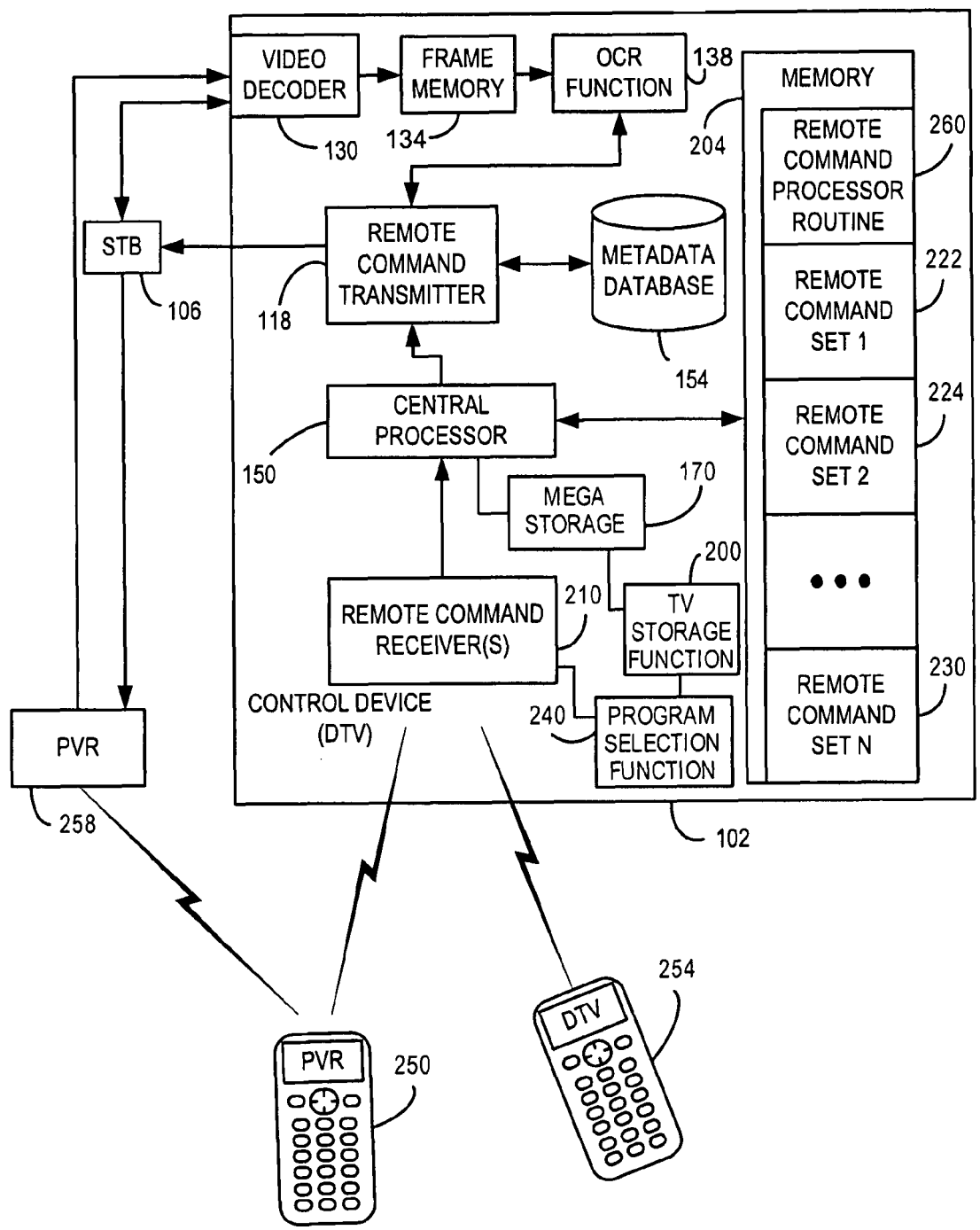
FIG. 3 is an example block diagram depicting a control device according to one embodiment in which multiple remote control command sets can be interpreted.

Acquiring Metadata through OCR processing as described above can be accomplished real-time as a user selects content from, for example, a service provider EPG or PVR menu of recorded content. Accomplishing this real time, in accord with certain embodiments, utilizes an ability of the control device to understand the control codes for multiple devices (e.g., a PVR and the DTV control device 102). This is illustrated in FIG. 3 in which a block diagram of a DTV acting as a control device is shown to receive and understand the commands from multiple remote control devices (or at least multiple command sets, since integrated or universal remote controllers may also be used). In this case, the example control device 102 receives commands from both PVR remote controller 250 and its own DTV remote controller 254. In this case, PVR RC 250 exerts control commands over PVR 258, but such commands are also listened to by control device 102. RC 254 provides full functional control over DTV control device 102 in this example.

In this example, DTV 102 has stored in memory 204 a remote command processor routine 260 that is able to access remote command sets 222, 224 through 230, one of which corresponds to the command set for the DTV 102 and another of which corresponds to a command set for PVR 258. Additionally, as shown in FIG. 2, a command set is available that controls STB access device 106 via remote command transmitter 118.

Hence, by recognition of multiple remote commands, a monitoring device (i.e., control device such as a DTV) attached to a player/receiver, e.g. Sony TV, including remote command receiver 210 and program selection function 240, can track the state of the receiver by monitoring remote control commands sent to that receiver by the user. The control device therefore interprets not only its own remote control codes but also that of the receiver. The keystrokes may be monitored separately or in conjunction with OCR techniques to interpret text rendered on screen to capture metadata regarding programs selected by a user.

By monitoring the keystrokes sent by the user to the receiver, the monitoring device can tell whether the receiver is doing the following: 1) accessing PVR content; 2) accessing the menu screen; 3) accessing the guide, 4) selecting a field which could be content, a sub-menu or other function from the menu, PVR or guide; 4) determining whether trick mode functions such as play, fast forward/reverse, skip forward/reverse, etc. are being used which would be indicative of PVR or VOD content is being accessed.

Monitoring two or more remote control codes—its own and another device may be accomplished by employing two or more IR receivers or an IR receiver that can interpret two sets of IR codes. In the later instance, the IR receiver may need to be provided with information as to which set of IR codes is being transmitted if there is overlap in the code sets. The control device, e.g. the DTV, is programmed to listen to two or more remote control codes.

In accordance with certain embodiments, the control device can determine that another device has been switched-off because the control device detected that the receiver "power" button has been pressed. If the TV input is not switched to other content (another port), then after some time, the TV itself could be switched-off. This might help the TV to be more energy efficient.

In one embodiment, the obtaining of metadata program information during channel changes may monitor when content is selected from an Electric Program Guide or EPG. In one embodiment, remote control commands are passed through from the recorder to the set top box using IR blaster or CEA-931B. When the set top box [GUIDE] button is pressed on the universal remote control, the recorder can become aware that the scheduled content is about to be browsed and chosen from the service provider EPG such as service provider EPG 300 as shown in FIG. 4.

It is noted that in the United States, there are a limited number of service providers available, each of which uses a more or less conventional style of electronic program guide. Two examples are provided in FIGS. 4 and 5. FIG. 4 is an exemplary screen shot adapted from an EPG used by DISH Network™ (EchoStar Technologies Corporation) and FIG. 5 is an exemplary screen shot adapted from an information screen used by Comcast™ (Comcast Corporation). Actual screen shots and other attributes may be copyright or trademarks of their respective owners. It is noted that the metadata associated with the television programming schedule is, in both cases and indeed in most EPGs, presented in a spreadsheet-like format time and date increasing from left to right in half hour increments with the channel and its associated program content appearing in rows below or above the time information.

Commonly, the metadata also incorporates more detailed information about a particular program. Such information is commonly represented at least in part on the EPG screen itself for a program that is highlighted on the EPG. FIG. 4 illustrates an example where additional information is not provided. This information may be complete and represent the entire program detail (see FIG. 5), or may be abbreviated as shown in FIG. 4. Thus, if shown in total, the detailed information about each program can be captured by OCR processing region 370 of FIG. 5 to determine the user selected programs from the EPG. System data and time can be obtained from region 66 using similar OCR technology. Alternatively, as in the case of FIGS. 5, 6 and 7, the full program detail may not be available. In this case, an "information" command can be issued for each program in order to display a detail page 320 for the particular program such as that shown in FIG. 5 and FIG. 8. This detail page contains a more complete description of the program (i.e., full review) in region 370, system time in 374 and ratings information in region 378.

Figures 4, 8:
FIG. 4 is an example of an electronic program guide (EPG) screen containing metadata that can be captured according to one embodiment.
FIG. 8 is an example of an on-screen display that can be generated by a set top box in response to an information command issued by a digital television according to one embodiment.
Figure 5:
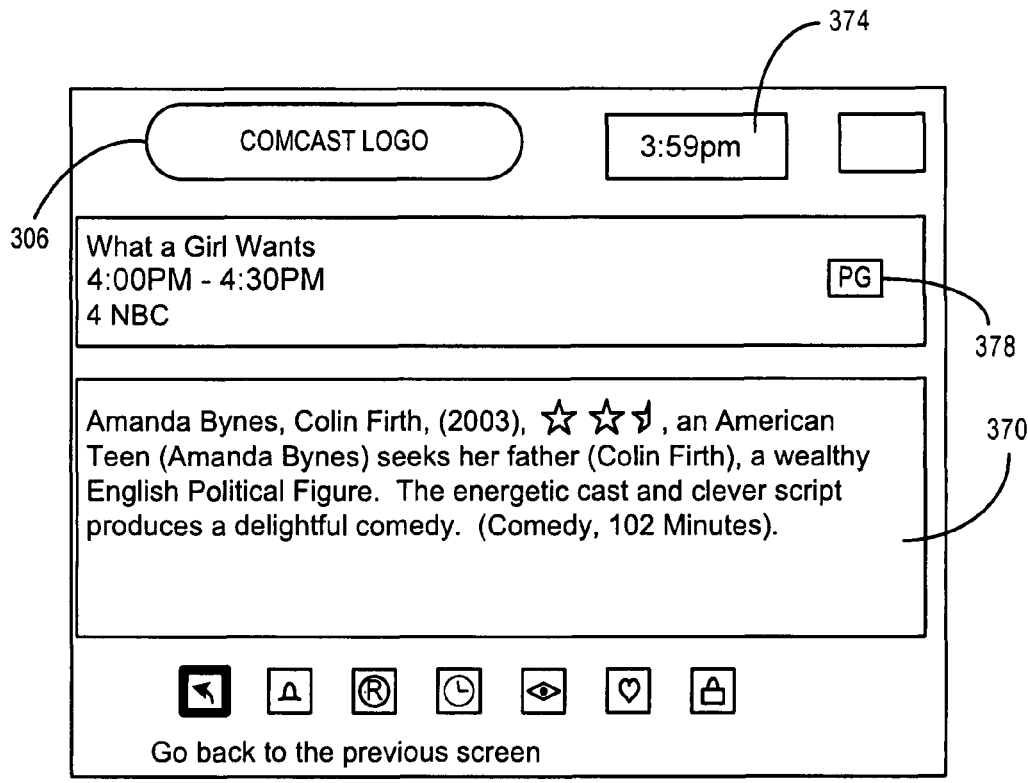
FIG. 5 is an example of a detail page in an EPG with metadata that can be captured according to one embodiment.
Figure 6:
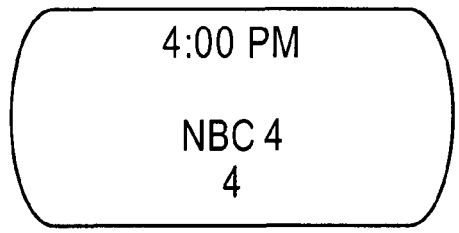
FIG. 6 is an example of an on-screen display generated in response to a channel change and containing mini-metadata that can be captured according to one embodiment.

However, some users are in the habit of merely toggling the up and down arrow buttons of a remote control to select a desired program, rather than accessing an EPG such as EPG 300 as shown in FIG. 4. For example, according to the DIRECTV® system of DIRECTV® of El Segundo, Calif., depending on the mode of the set top box, in response to a channel change by a user by toggling the up and down arrows of a remote control, the set top box may cause the generation of an on-screen display such as OSD 340 as shown in FIG. 6.

Representatively, OSD 340 is limited to the current system time, which is indicated as 4:00 p.m., as well as the network, which is indicated as NBC 4, and the actual channel of the device, which is indicated as channel 4. This minimum amount of information, in some embodiments, is referred to as mini-metadata because it only provides a portion of the metadata regarding a selected program and omits at least the program title, the program start and end time, the duration as well as any information regarding the rating and title of the show.

In one embodiment, as shown in FIG. 2, a digital television device or DTV device 102 can be coupled to a network 166 such as a DLNA network. When the control device 102 detects a mode of the set top box to display a OSD as shown in 340, central processor 150 may direct access to internet metadata service 200 which may access an online electronic program guide for the content provided by set top box 106. According to such an embodiment, initial or mini-metadata program information may be supplemented such that the content selected by the user may be stored within mega storage 170 with sufficient metadata to provide the user with general program information.

In one embodiment, when mini-metadata is provided by an OSD in response to a channel tuning event, the receiver device can then use the "info" command to access additional detail available for each program to collect that sub-menu data about each program. Once the TV has this information stored in its own metadata database, it can then carry out any number of actions and create timers for recording, etc. without need for direct access to the metadata and without need for any special service such as that provided by Tivo™ for the scheduling data required. All the data comes from the video of the slaved access device such as a cable set-top box.

Figure 7:
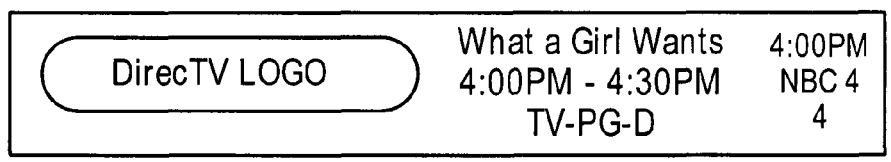
FIG. 7 is another example of an on-screen display that is generated in response to a channel change and contains metadata that can be captured according to one embodiment.

FIG. 7 further illustrates an on-screen display 360 which may be generated by set top box in response to a user channel change by toggle of the up and down arrows. As shown in FIG. 7, OSD 360 supplements the information included in OSD 340 of FIG. 6 by including the title of the selected program, the start and stop time of the selected program, a rating of the program, as well as the system time, the network name as well as the current channel. According to such an operating mode, sufficient metadata may be determined from an OSD such as OSD 360 as shown in FIG. 7 to enable recording of the selected content to mega storage 170 as shown in FIGS. 1-3.

In a third mode of operation, set top box may generate information similar to the on-screen display 320 as shown in FIG. 5 in response to channel change events which would contain complete metadata information for the selected program. In one embodiment, when the set top box operates according to the mode where an on-screen display 340 is illustrated in one embodiment a DTV device may issue an information command to the set top box to cause the generation of an information screen such as information screen 400 as shown in FIG. 8. This information screen would enable the supplementing of information generated from OSD 340 and would result in the generation of such info screen 400 to the user which might degrade the user's interface experience.

Referring again to FIG. 4, when a user selects a program using the EPG 300, generally there will be a certain number of right and left arrows, paging up and down until finally the [SELECT] or [CANCEL] button is pressed. Both commands, [SELECT] and [CANCEL], are intercepted by remote command receiver 210 as shown in FIG. 3. In one embodiment, when the [SELECT] command is used, the user has just attempted to choose some content. When the content is already being broadcast, then the content would be immediately tuned by the receiver, with an OSD displayed depending on the mode of STB 106. Otherwise, a timer may be created.

In one embodiment, DTV 102 captures the OSD and may optionally display data which can be overlaid on the video output from the set top box with the following query: Do you want to archive this content to persistent storage. The [Up] [Down] arrows and [SELECT] will be momentarily interpreted by the recorder and not the set top box. A negative answer will disable the decoding operations of the capture OSD by the recorder for this visit to the guide. An affirmative answer may cause the following data to be overlaid on the video on the lower part of the screen: One moment, the recorder will attempt to scan the necessary information.

Generally, the set top box may generate an on-screen display as the content is selected which may be scanned to determine metadata regarding the selected program. The OSD generated by the set top box may provide a minimum amount of information including the system time, the channel from which the content is being provided and the name of the network, as shown in FIG. 6. In a further embodiment, remote command transmitter may issue an [INFO] command which will cause the set top box to provide an information screen such as information screen 400 as shown in FIG. 8. By analyzing the information, the recorder will know whether the program is playing right now or in the future by looking up the start time and comparing it to the system time (which is also shown in the [INFO] OSD 400 as shown in FIG. 8).

Subsequently, a [CANCEL] command can be sent to the set top box to tear down the [INFO] OSD 500 as shown in FIG. 6. At which point, a banner such as indicating: One moment, the recorder will attempt to scan the necessary information, may be torn down by issuing the [CANCEL] command. Subsequently, a [SELECT] command can be sent to the set top box. When the [SELECT] command is sent, if the program is currently playing, the set top box will tune directly to the program. If the program is selected for the future, a time creation LSD will typically be rendered on the screen which may happen whether a set top box is PVR enabled or not since timers can be created regardless of whether content is recorded or not.

In one embodiment, there will be some up/down, left/right arrows until finally a [SELECT] command is sent. In one embodiment, the [SELECT] command may be intercepted or a second scan is performed. A highlighted field is determined to see if once, daily, weekly, monthly or other like selection criteria is provided to enable the set up of a similar timer for storing content within mega storage 170 as shown in FIG. 3.

Figure 9:
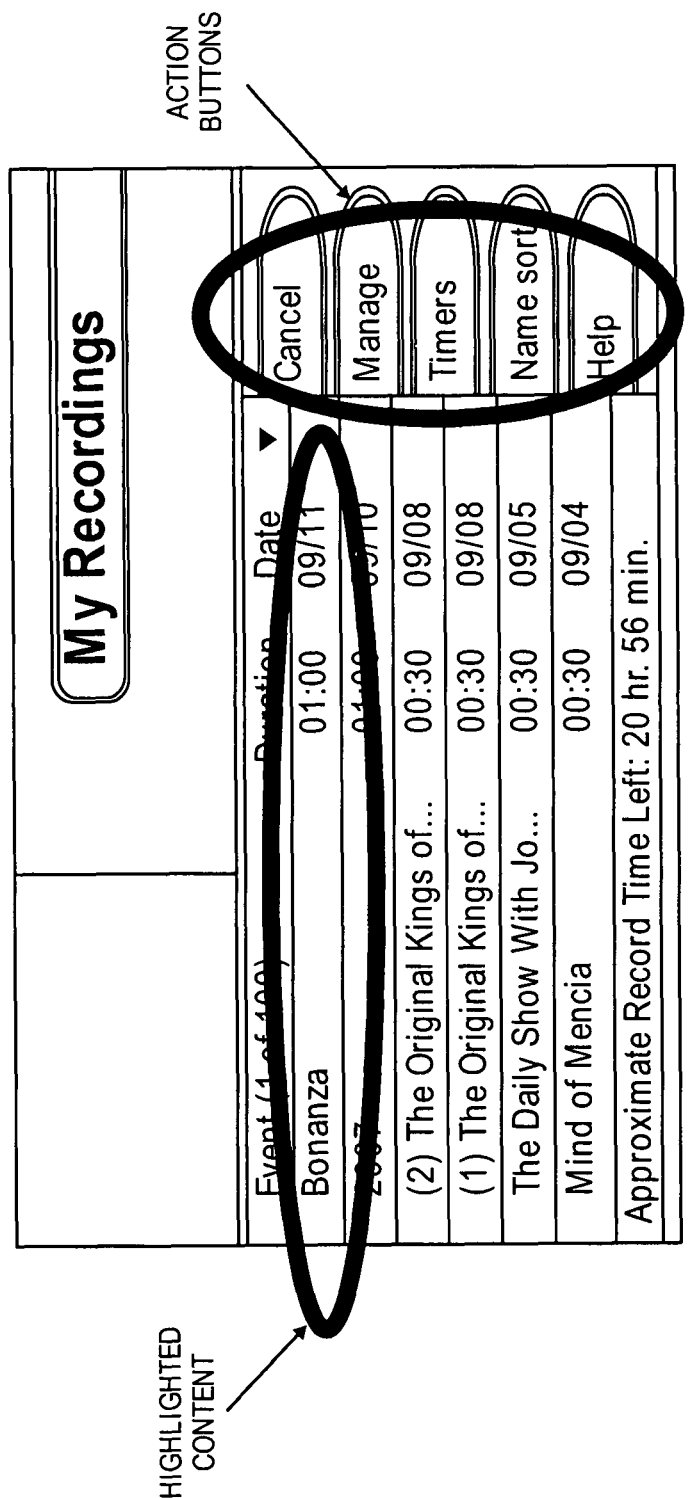
FIG. 9 is an example of an on-screen display of an index of recorded programs (IRP) that is generated in response to user access to the content of a personal video recorder according to one embodiment.

In one embodiment, whenever the [DVR]/[LIST] button is pressed on the universal remote control, the recorder can become aware that content is about to be browsed from the index of recorded programs (IRP), such as IRP 500 as shown in FIG. 9. Browsing can be monitored to find content to play, but might also be to delete or change the periodic timer associated with that particular content using the action buttons. Generally there will be a certain number of right and left arrows, paging up and down until finally the [SELECT] or [CANCEL] button is pressed. These may be intercepted by remote command receiver 210.

In the IRP application, one of the action buttons may have been selected and not recorded content. To determine the highlighted field in the IRP application, the recorder can scan the screen using OCR. If it was content that is highlighted, then the situation is similar to the content selected from the guide discussed previously. If content was not highlighted, e.g., one of the action buttons is being selected, then the [SELECT] command can be sent through to the set top box.

At this point, the DTV can know that content was highlighted. Once the user selects the [SET] command, a brief on screen display may be rendered by the television which may be captured and scanned. At this point, because the IRP is currently being accessed, the set top box will not and should not respond and record since it does not make sense for this menu, but the Blu-ray recorder can. A recorder which has been keyed up can respond to the [RECORD] command to perform the following:

1) The Recorder can display banner which is overlaid on the video output from the set top box with the following query: Do you want to move this content to Blu-ray disc. If the answer is yes, instead of setting the [SELECT] remote control command, the [INFO] command is sent. The [INFO] command will cause all metadata associated with the program to be displayed similar to FIG. 3 including the title and episode number. The [INFO] screen can be OCR'd by the recorder. The title and episode number can be matched with and obtained through the OCR scan procedure and AVC play command sent from this specific content. A [CANCEL] remote control command can be then sent to tear down the OSD. If the answer is no, then the [SELECT] command is sent without further delay.

According to one embodiment to the use of OCR technology in remote control manipulation, cable content may be recorded to DVD or Blu-ray or other like persistent storage using only the service provider's set top box EPG and the user interface. According to the embodiments, the service provider's electronic program guide or EPG is not replaced but instead a limited amount of information metadata is scanned to enable synchronization of the tuning of a receiver with a recorder while using the service provider EPG as well as proper archiving and direct recording of the selected content for first generation copies of a DVD, Blu-ray disc or other like persistent storage. In addition, transfer set top box recorded content to discs for archival purposes may be provided in order to overcome the persistent problem of the lack of storage within the hard disk drives of a personal video recorder.

It is noted that no cooperation from the service provider is needed to carry out the processes described and no outside data source is needed (although use of an outside data source to augment the information captured as described is not precluded). Embodiments consistent with the invention display all the metadata on-screen in order to dump it from the access device receiver. All the metadata gets OCR processed and re-recorded by the controlling device, e.g. the digital TV. No other data source is needed so the limitations imposed by withholding access to the metadata are effectively circumvented.

Moreover, embodiments may be utilized to communicate through video with no dedicated back channel. The embodiments disclosed does require a mechanism to control the operation of the access device, e.g. an IR transmitter to transmit commands, but then the information received is sent only as a video representation. Hence, in some embodiments, an unsightly set top box access device could even be totally hidden from view and controlled by a control device such as 102 using any suitable command mechanism.

Although discussed in terms of infrared RC codes, IR may be replaced by RF signaling. Multiple RF frequencies may be monitored or multiple codes within a single RF frequency may be monitored. Procedural methods for implementing one or more embodiments are now described.

Operation

Turning now to FIG. 7, the particular methods associated with various embodiments are described in terms of computer software and hardware with reference to a flowchart. The methods to be performed by a computing device (e.g., a digital TV device) may constitute state machines or computer programs made up of computer-executable instructions. The computer-executable instructions may be written in a computer program and programming language or embodied in firmware logic. If written in a programming language conforming to a recognized standard, such instructions can be executed in a variety of hardware platforms and for interface to a variety of operating systems.

In addition, embodiments are not described with reference to any particular programming language. It will be appreciated that a variety of programming languages may be used to implement embodiments as described herein. Furthermore, it is common in the art to speak of software, in one form or another (e.g., program, procedure, process, application, etc.), as taking an action or causing a result. Such expressions are merely a shorthand way of saying that execution of the software by a computing device causes the device to perform an action or produce a result.

FIG. 7 is a flowchart illustrating a method 600 of obtaining metadata program information during channel changes according to one embodiment. FIG. 7 depicts an exemplary process 600 that can be used to obtain real time metadata in accordance with one embodiment. An exemplary use for this embodiment involves acquiring metadata for content received from the service provider set-top box 106 so that it may be recorded along with the content. This is accomplished without need for a complete dump of all metadata present in the entire EPG database. Acquisition of metadata is limited to the metadata associated with the content being selected.

Referring again to FIG. 3, in this process, the remote control commands from 250 are monitored by program selection function 240. (Note that the PVR 258 could readily be a part of STB 106 without departing from the described embodiments, and the term "accessory device" used in the drawing should not be construed to exclude internal accessory devices.) Referring again to FIG. 7, the PVR commands are monitored first for an activation command (e.g., the PVR is being turned on or selected) at 608 (here the term activation command can be construed to be an equivalent sequence of commands such as a menu command followed by a guide command selection from the menu, without limitation—i.e., a command or sequence of commands that that activates a mode of operation having potential for selection of a program activates a mode of operation having potential for selection of a program).

Once the activation command is received at 612, the RC commands from RC 250 are monitored for a [SELECT] command at 616. Issuance of such a command (without the command being preceded by an off command to the PVR) is indicative that content has been selected for some purpose (e.g., playback, recording, browsing, etc.). At this point, when a [SELECT] command is received at 620, the control device 102 captures an OSD that is temporarily displayed at 624. Selection of content results in display of metadata as visual information to the video output of the access device 106. By use of the previously described OCR process, the metadata can be captured and stored at 628.

In one embodiment, the OSD generated in response to a channel tuning event is captured and the extracted metadata is supplemented with additional metadata from an Internet metadata service such as an online EPG. Note that in alternative embodiments, any signal that is indicative of selection of content can be harnessed as a trigger to issue an [INFO] command. Additionally, the control device 102 can readily render an on screen display to ask the user if he or she desires to capture the metadata and permit the user to make such a decision prior to carrying out the [INFO] command and OCR processing if desired. Many other variations are possible without departing from embodiments consistent with the present invention.

In some instances, additional metadata may be at 632 which can usually be retrieved by a second issuance of an [INFO] command or a [PAGE DOWN] command at 624 which can similarly be processed via OCR processing as previously described. Once the desired metadata are captured (in a matter of seconds or fractions of a second), phantom [CANCEL] commands are issued to the access device 106 to restore the device to the prior state selected by the user at 636. At process block 636, the selected program is recorded in conjunction with the metadata by a digital TV and the process terminates.

In the embodiments described where a channel selection event is detected, the amount of metadata that can be captured and decoded from an on-screen display that is generated by the set top box in response to the program selection event may provide a minimum amount of metadata limited to, for example, as little as the program channel as well as the current time. (See, FIG. 6.) Using such information at process block 634, access may be made to an Internet service to acquire additional metadata for the selected program.

For example, in one embodiment, as shown in FIG. 2, a home network may be coupled to DTV 102 as well as mega storage 170 which provides or supplements content recording capabilities provided by set top box 106. In accordance with such an embodiment, a wide area network (or WAN 168) may be accessed to an Internet metadata service 200. In one embodiment, such Internet metadata service may be, for example an online electronic program guide from the service provider. Based on such online program guide, additional information may be determined based on the current time as well as the program channel to determine additional metadata required to provide a recording of such content within mega storage 170. In the embodiments described, such information may include, but is not limited to, title, rating, actors, year produced as well as the channel from which the content is recoded as well as the current time and duration of the content.

To further summarize, the remote control keypresses are monitored. Whenever, for example, [GUIDE] or [PVR] or [ON] or [LIST] for a PVR are pressed (note that it is not inconsistent for these commands to be issued to the STB 106 which may or may not incorporate a PVR), monitoring commences. [UP], [DOWN], [PAGE UP], [PAGE DOWN] and other keys are pressed by the user until finally [SELECT] is pressed. At this time, a phantom [INFO] command is sent briefly (long enough to store in a frame store for OCR processing) displaying all the metadata associated with a particular program. This screen of information is OCR'ed into a database for the program about to be selected. A [CANCEL] command is then sent returning the set-top box to the guide or PVR menu screen.

In the described embodiments, the "interception" of the [SELECT] keypress can be done by 1) a specialized remote or 2) remote control pass-through and change functionality from the control device (e.g. TV or recording device). One advantage of this OCR approach is that the entire EPG does not need to be acquired by the control device. Only the content that was selected from the service operator's EPG. Issuance of the [INFO] command will generally cause all the metadata descriptive content for a program to be displayed. In those instances where additional info is available, the second loop triggered by 632 can be used. In one embodiment, the control device can scan the data at the time of its brief display to properly record content for archiving and sharing purposes.

Any content from any player that outputs analog might be captured, compressed and distributed over IP. Metadata can be acquired by manipulating a player, e.g., DVD or Blu-ray, VCR, etc. and then scanning the OSDs. That information can be sent along with the content in IP packets if desired. Other variations will occur to those skilled in the art upon consideration of the present teachings.

In the case where the PVR is integral to the STB 106, the issuance of any number of commands can be interpreted as a trigger in 608 to begin looking for selection of a program. For example, a [GUIDE] or [PVR] command at 608 can initiate the process. Additionally, issuance of a [PVR RECORD] command alone can be used to trigger issuance of the [INFO] command to extract the associated metadata.

Thus, a method of capture of program metadata in near real time consistent with certain embodiments involves monitoring remote control commands to detect an activate command that activates a mode of operation having potential for selection of a program; upon receipt of the activate command, further monitoring remote control commands for a selection command that selects a program; upon receipt of the selection command, capture an on-screen display that an access device generates in response to a program selection event, when the on-screen display includes a video frame containing metadata associated with the program; and optical character recognition (OCR) processing the video frame containing the metadata relating to the program in order to extract the metadata associated with the program.

In certain embodiments, where additional information is required, an access device may be caused to generate an information screen in response to an issued [INFO] command. The method further involves issuing a cancel command that causes the access device to exit the metadata display. In certain embodiments, the activate command includes one of a program guide display command, a recorded program list display command and a playback device activation command. In certain embodiments, the activate command includes a sequence of commands. In certain embodiments, the selection command is preceded by a sequence of navigation commands. In certain embodiments, the OCR processing is carried out on a selected segment of the video frame.

In one embodiment, the process further involves recording the metadata in association with recording a copy of the content. In certain embodiments, the issuing involves transmitting of one of an infrared remote control command and an RF remote control command. In one embodiment, the process is carried out by a control device that is not a target device of at least one of the activate and selection commands. In certain embodiments, the process is carried out in a digital television device, wherein the digital television device is not a target device of at least one of the activate and selection commands.

In one embodiment, the process further involves issuing a further information command that causes an access device to generate another video frame containing metadata associated with the program; and optical character recognition (OCR) processing the another video frame containing the metadata relating to the program in order to extract additional metadata associated with the program. In certain embodiments, the access device includes a television set top box, and wherein the process is carried out on a digital television device. In certain embodiments, a computer readable storage medium stores instructions which, when executed on a programmed processor, carry out any of the processes above.

In another embodiment, a control device captures program metadata in near real time and has a control processor that controls a process wherein a remote control command receiver monitors remote control commands to detect an activate command that activates a mode of operation having potential for selection of a program. Upon receipt of the activate command, the remote control command further monitors remote control commands for a selection command that selects a program. Upon receipt of the selection command, on-screen display generated by an access device is captured. Depending on the mode of operation of the STB, the control processor causes a remote control command transmitter to issue an information command that causes an access device to generate a video frame containing additional metadata associated with the program. A video receiver receives the video frame. An optical character recognition (OCR) machine processes the video frame containing the metadata relating to the program in order to extract the metadata associated with the program.

However, the described embodiments are not to be considered to be limited to the exact command structure or command sequence structure that are used in the remote control paradigm used in such conventional remote controller devices. Equivalently, television devices that are more computer based may utilize a point and click paradigm for navigation of menus to issue equivalent commands. So, a mouse, trackball, touch pad or other pointer device used in conjunction with a selection mechanism (e.g., a right or left click of a dual switch mouse) can produce equivalent set of commands and are entirely equivalent for purposes of defining embodiments consistent with the present invention. Thus, playback from a PC device using Microsoft Windows Media Player might include a sequence of operations including pointing to a Windows Media Player icon, clicking on the icon, pointing to a "Library" tab and clicking on the "Library" tab, pointing to an "all video" menu selection and clicking, followed by pointing to a video selection and clicking. Such a paradigm generally includes action of a pointing device to point followed by clicking a pointer select button to implement a selection operation. Thus, in a similar manner, if a user is to implement a [MENU] or [GUIDE] command using such a point and click paradigm, the operation would involve manipulation of an on-screen cursor to a desired menu location (icon, text, logo, image, thumbnail, etc.) representing a [MENU] or [GUIDE] function followed by an operation that selects the command associated with the cursor location. For purposes of embodiments of this invention, this sequence of operations is intended to be embraced in its entirety by the shorthand notation of [MENU] or [GUIDE] without regard for how such sequence of commands are implemented.

At this writing, cursor movements have been implemented using any number of functions including detection of wrist or hand motion using inertial detectors, sometimes in connection with detection of gravitational force as an up-down reference point. Movement to a particular cursor location (e.g., an edge or corner of the screen) can be used to invoke a particular menu. An example of such devices is produced by Hillcrest Laboratories, Inc. of Rockville, Md. which uses a scroll wheel and select buttons in conjunction with motion sensing technology (referred to as Spontaneous Navigation™) configured in a circular doughnut shaped device that is hand held. In this device, navigation is carried out by movement of the hand or wrist, and such movements are used in cooperation with selection buttons and a scroll wheel. However, this paradigm is but a newer incarnation of point and click functions that use different hand motions than those, for example, of a computer mouse.

Hence, in summary, when bracketed commands such as [ON], [MENU], [LIST] or [GUIDE] are used herein, it is to be understood that equivalent functions can be carried out by point an click interfaces or other user interface paradigms without departing from the teachings consistent with embodiments of the present invention. Such point and click implementations are functionally identical and within the scope of the present claims in that any command that implements the bracketed command will produce the video frame that can be interpreted by OCR process analysis.

Alternate Embodiments

Several aspects of one implementation of the obtaining metadata program information during channel changes are described. However, various implementations of the location-based message provide numerous features including, complementing, supplementing, and/or replacing the features described above. Features can be implemented as part of the DTV or as part of a home entertainment network in different embodiment implementations. In addition, the foregoing description, for purposes of explanation, used specific nomenclature to provide a thorough understanding of the embodiments of the invention. However, it will be apparent to one skilled in the art that the specific details are not required to practice the embodiments of the invention.

It is to be understood that even though numerous characteristics and advantages of various embodiments have been set forth in the foregoing description, together with details of the structure and function of various embodiments of the invention, this disclosure is illustrative only. In some cases, certain subassemblies are only described in detail with one such embodiment. Nevertheless, it is recognized and intended that such subassemblies may be used in other embodiments. Changes may be made in detail, especially matters of structure and management of parts within the principles of the embodiments to the full extent indicated by the broad general meaning of the terms in which the appended claims are expressed.

Having disclosed exemplary embodiments and the best mode, modifications and variations may be made to the disclosed embodiments while remaining within the scope of the embodiments of the invention as defined by the following claims.

What is claimed is:

1. A method comprising:
capturing from the digital television (DTV) an on-screen display being rendered by the DTV device, the on-screen display generated by an access device in response to a program selection event, wherein the access device is a target of a detected remote control command that triggered the program selection event and is separate from the DTV device, the captured on-screen display being a video frame included in a program selected by the program selection event;
decoding, by the DTV device, the captured on-screen display to generate metadata for the program selected by the program selection event, wherein metadata is provided for the selected program by a service provider and is restricted to the access device by the service provider of DTV programming;
storing, by the DTV device, the metadata in a database included in the DTV device; and
generating, by the DTV device, a user interface using the metadata stored in the database that is different from the user interface generated by the access device.

2. The method of claim 1 further comprising:
recording, by the DTV device, the program selected by the program selection event in conjunction with the determined metadata for the program selected by the program selection event.

3. The method of claim 1, wherein prior to the capturing of the on-screen display, the method further comprising:
monitoring remote control commands issued to the access device to detect an activate command that activates a mode of operation having potential for selection of the selected program;
upon receipt of the activate command, further monitoring remote control commands for a selection command that selects the selected program; and
detecting a program selection event if the selection command is identified that selects the selected program.

4. The method of claim 1, wherein decoding the captured on-screen display further comprising:
optical character recognition (OCR) processing a video frame of the captured on-screen display containing the metadata related to the selected program to extract the metadata associated with the selected program.

5. The method of claim 1, wherein decoding the captured on-screen display further comprising:
determining one or more of a program name, a start time and an end time of the program selected by the program selection event; and
searching a network to determine additional program information according to the one or more of the program name, start time and end time of the program selected by the program selection event.

6. The method according to claim 3, carried out in the DTV device, wherein the DTV device is not a target device of at least one of the activate and selection commands.

7. The method of claim 1, further comprising:
issuing, by the DTV device, an information command that causes the access device to generate a video frame containing additional metadata associated with the selected program; and
optical character recognition (OCR) processing the video frame containing the metadata relating to the program to extract additional metadata associated with the program.

8. The method of claim 7, wherein the access device comprises a television set top box that is a target of a remote control selection command, and wherein the process is carried out on the DTV device.

9. A computer readable storage medium storing instructions which, when executed on a programmed processor, carry out a process according to claim 1.

10. The method of claim 1 wherein the program selection event is one of a channel tuning event, a selection from a list of recorded programs on a personal video recorder (PVR), a selection from a list of Video on Demand (VOD) programs, a selection to play package media, a selection from a list of content stored on portable media, a selection from a list of content stored on portable devices.

11. The method of claim 1 wherein the metadata is at least one of a program name, a parental rating, a program duration, a channel number program was recorded from, channel name program was recorded from, current data and time and the current list of favorites which is active.

12. A method comprising:
detecting, by a digital television (DTV) device, a remote control command that selects a program, wherein an access device is a target of the detected remote control command and is separate from the DTV device;
capturing a video frame that is rendered by a digital television (DTV) device, the video frame generated by the access device that is the target of the detected remote control command; and
decoding, by the DTV device, the captured video frame to generate metadata regarding the selected program, wherein metadata is provided for the selected program by a service provider and is restricted to the access device by the service provider of DTV programming;

storing, by the DTV device, the metadata in a database included in the DTV device;

generating, by the DTV device, a user interface using the metadata stored in the database that is different from the user interface generated by the access device; and issuing, by the DTV device, an information command that causes the access device to generate a video frame containing additional metadata associated with the selected program.

13. The method of claim 12, wherein the DTV device is not a target of the detected remote control command.

14. The method of claim 12, wherein detecting the remote control command further comprises:

monitoring, by the DTV device, remote control commands issued to the access device that is separate from the DTV device to detect an activate command that activates a mode of operation having potential for selection of a program;

upon detection of the activate command, further monitoring remote control commands issued to the access device that is separate form the DTV device to detect a selection command that selects a program; and upon detection of the selection command, issuing an information command that causes the access device to generate a video frame containing additional metadata associated with the program.

15. The method of claim 12, further comprising recording, by the DTV device, the metadata in association with recording a copy of the program.

16. The method of claim 12, further comprising:

generating, by the access device that is a target of the detected remote control command, an on-screen display including metadata regarding the selected program; and optical character recognition (OCR) processing the on-screen display containing the metadata relating to the program to extract the metadata associated with the program.

17. A system comprising:

a digital television (DTV), including a remote control command receiver to detect a remote control command that selects a program, and a video receiver;

decode logic to capture a video frame that is rendered by the video receiver that receives the video frame from an access device that is a target of the detected remote control command and is separate from the DTV, the decode logic to decode the captured video frame to generate metadata regarding the selected program, wherein metadata, provided for the selected program by a service provider, is restricted to the access device by the service provider of DTV programming; and a network coupled to the digital television, the digital television to request additional program information regarding the selected program according to the generated metadata regarding the selected program, wherein the DTV is further to, upon detection of the remote control command that selects the program, issue an information command that causes an access device to generate an on-screen display containing additional metadata associated with the selected program, wherein the DTV device is further to store the metadata regarding the selected program in a database included in the DTV device and to generate a user interface using the metadata stored in the database that is different from the user interface generated by the access device.

18. The system of claim 17, wherein an access device to generate a video frame containing metadata associated with the program in response to the remote control command that selects the program.

19. The system of claim 18, wherein the access device comprises a set-top box that is a target of the remote control command that selects a program.

20. The system of claim 17, wherein the decode logic further comprises:

optical character recognition (OCR) logic to process a video frame of the captured on-screen display containing the metadata related to the selected program to extract the metadata associated with the selected program.

21. The system of claim 17, wherein the DTV is not a target of the remote control command that selects the program.

* * * * *